United States Patent Office 3,291,302
Patented Dec. 13, 1966

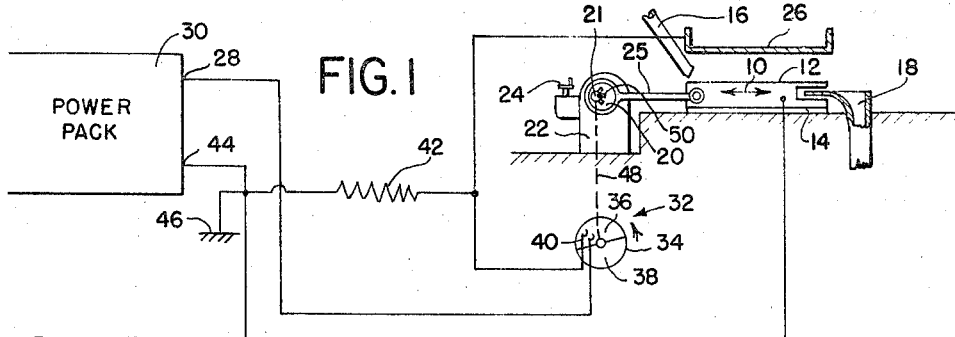
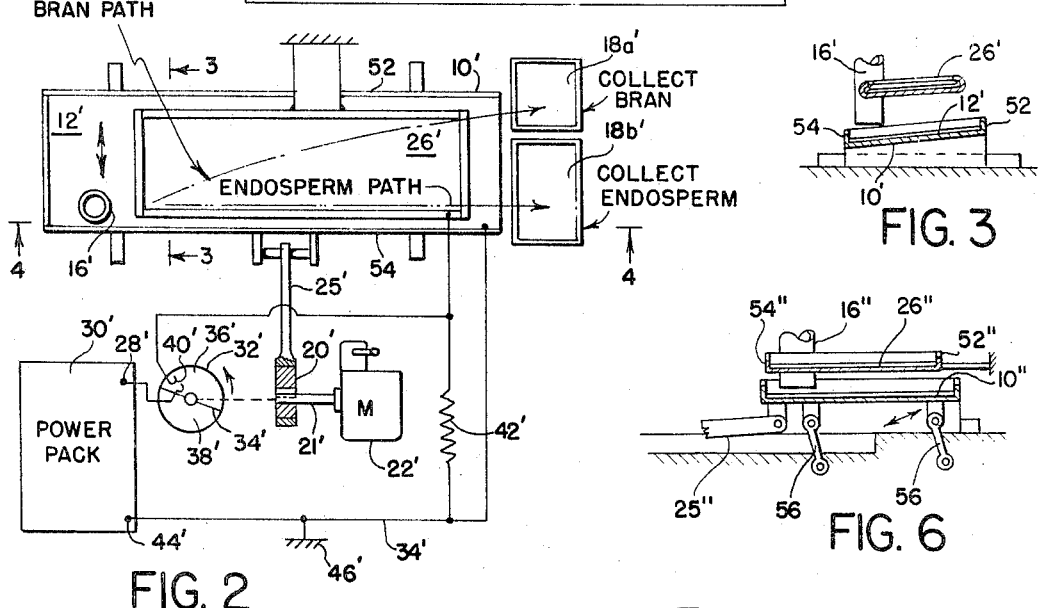
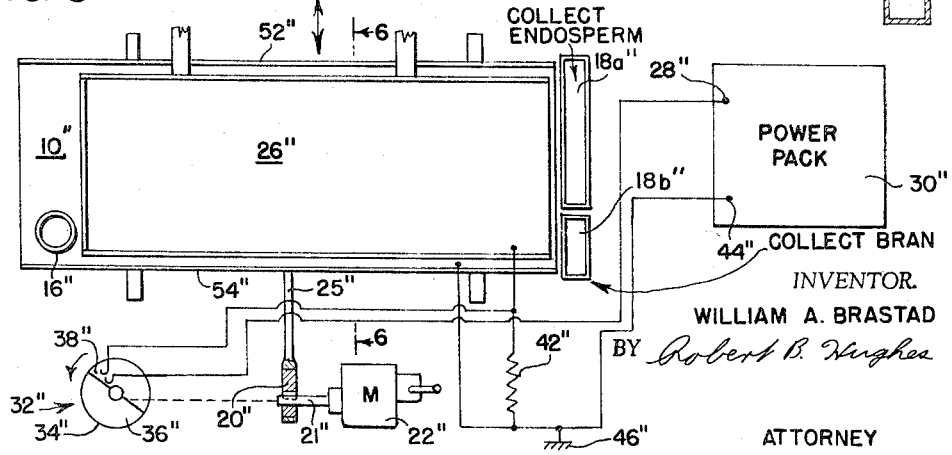

3,291,302
CONVEYING AND SEPARATING APPARATUS
AND PROCESS
William A. Brastad, Minneapolis, Minn., assignor to
General Mills, Inc., a corporation of Delaware
Filed Oct. 28, 1963, Ser. No. 319,324
14 Claims. (Cl. 209—12)

This invention relates to the conveying and classification of material, and more particularly to a process and apparatus utilizing vibratory and electrostatic means, and adapted for use with particle-like material, such as flour milling stock, to provide conveying of the same, and more especially to provide for the classification of such material by the selective conveying thereof.

Many different vibratory devices have long been widely used in connection with granular material such as flour milling stock for various purposes (e.g. to classify, to convey, to convey and sift simultaneously, etc.), as have various electrostatic devices. And various types of apparatus have been devised which utilize vibratory devices in combination with electrostatic means to classify material, often specifically, for the purpose of obtaining a classification of flour milling stock. Although many of such conveying, classifying, or classifying and conveying mechanisms have been found to be useful to various degrees, efforts are still being directed to improving the same and making them more practical with regard to such things as efficiency, versatility, cost of operation and maintenance, initial cost of the installation, rate of output, etc.

Accordingly, it may be stated as an object of the present invention to provide an improved process and apparatus to convey particle-like material such as flour milling stock, and especially to selectively convey such material to obtain a classification thereof.

It is a more particular object to achieve the aims of this aforestated object by utilizing an oscillating material carrier in timed relationship with phased electrostatic means to obtain a conveying motion of such material, and especially to obtain a differential conveying motion to accomplish a classification of the material.

It is a further object to accomplish the ends of the aforestated objects in a manner that is generally practical, in that the various factors relating to the quality or practicality of such devices (such as those mentioned previous to this recitation of objects) are so present in this invention that it readily lends itself to commercial use.

These and other objects and features of the invention will be more readily understood and appreciated from the following detailed description of the preferred embodiments thereof selected for purposes of illustration and shown in the accompanying drawings, in which:

FIGURE 1 is a semi-schematic side elevational view of a first embodiment of the present invention;

FIGURE 2 is a semi-schematic top plan view of the apparatus of a second embodiment of the present invention;

FIGURE 3 is a transverse sectional view taken on line 3—3 of FIGURE 2;

FIGURE 4 is a longitudinal sectional view taken on line 4—4 of FIGURE 2;

FIGURE 5 is a semi-schematic top plan view similar to that of FIGURE 2, and showing yet a third embodiment of the present invention, and FIGURE 6 is a transverse sectional view taken generally on line 6—6 of FIGURE 5.

The apparatus illustrated schematically in FIGURE 1 embodies the present invention in a simpler form as compared with second and third embodiments here illustrated in, respectively, FIGURES 2-4 and FIGURES 5 and 6. In the first embodiment of FIGURE 1, no attempt is made to obtain a classification or separation of material, but merely to convey the material from one location to another. As will be disclosed more fully hereinafter, the second and third embodiment effect a selective conveying of material so as to classify the same.

In FIGURE 1, numeral 10 designates a carrying member having a generally horizontal, upwardly disposed carrying surface 12 and mounted, as at 14, for horizontal reciprocating motion along the longitudinal axis thereof. Suitable feed and collecting means are illustrated at 16 and 18, respectively, in a manner that particulate material is supplied onto the carrying surface 12 at the rear or infeed end of the carrying member 10 and collected at the front or outfeed end thereof. To reciprocate the carrying member 10 along its longitudinal axis, there is an eccentric 20 driven by a shaft 21 from a motor 22 having a speed adjusting handle 24, which eccentric 20 is operatively connected by a drive rod 25 to the rear end of the carrying member 10.

Positioned moderately above, parallel to and generally coextensive (with regard to its horizontal area) with, the carrying surface 12 of the member 10 is an electrically conductive plate 26 which serves as an upper electrode. To establish periodically a potential difference between the upper electrode 26 and the carrying member 10, which is made of a conductive material so as to serve as a lower electrode, the upper electrode 26 is electrically connected to one terminal 28 of a power pack 30 through a switching device, generally designated 32, which functions to transmit current only during a selected portion (or if desired, portions) of each cycle of reciprocation of the carrying member 10. As shown herein, this device 32 comprises a rotating disc 34, one surface of which is divided generally diametrically into a conducting portion 36 and a non-conducting portion 38. The upper electrode 26 is connected to one of a pair of brushes, indicated schematically at 40 which ride along said surface of the disc 34, and are located on the same radius line thereof. The one terminal 28 of the power pack 30 is connected to the other brush 40 so that the upper electrode 26 makes connection with the terminal 28 on every half cycle of rotation of the disc 34. This upper electrode 26 is also connected electrically through a resistance 42 to a second terminal 44 of the power pack 30, which terminal 44 is grounded as at 46. The carrying member 10 is also connected to ground at 46, and is, as before stated, made of conductive material so as to serve as a lower electrode. Thus, when an electrical charge is imparted to the upper electrode 26 so as to establish a voltage between the upper electrode 26 and the lower electrode (i.e. the carrying member 10) the charge on the upper electrode 26 will in a short time discharge itself through the resistance 42 to ground.

By driving the disc 34 directly from the same drive shaft 21 which turns the eccentric 20, the disc 34 can be caused to rotate at the same speed as, and at a predetermined phase angle with respect to, the eccentric 20. (The operative connection between the output shaft 21 of the motor 22 and the disc 34 is indicated schematically by the broken line 46.) So that the phase relationship between the eccentric 20 and the disc 34 can be changed (which would in turn change the phase relationship between establishing a voltage between the electrodes 26 and 10 and the reciprocating motion of the lower carrying electrode 10), the drive shaft 21 is connected to the eccentric 20 by an adjustable connection shown schematically at 50.

In operation, the material to be conveyed is supplied to the infeed chute 16 onto the rear end of the carrying surface 12 of the lower electrode 10. The motor 22 turns the eccentric 20 at a suitable speed (e.g. nine to ten cycles per second) and through an oscillating path of sufficient length (for example, one inch) so that the particulate material is caused to slide back and forth longitudinally with respect to the carrying member 10. With nothing else being provided, it would be expected that on the rearward portion of the cycle of reciprocation of the carrying electrode 10, the frictional force between the surface 12 and the material thereon would impart a rearward increment of travel to such material, and on the forward portion of the cycle of reciprocation of the carrying member 10, an equal increment of forward travel would be imparted to the material thereon. However, the switching device 32 is so arranged that during the rearward travel of the lower electrode 10, the brushes 40 are riding over the conductive portion 36 of the disc 34 so that the one terminal 28 of the power pack 30 is connected to the upper electrode 26 so as to charge the same with respect to the carrying member 10. Thus an electrostatic field is created between the upper and lower electrodes 26 and 10, which electrostatic field tends to lift the particulate material which is carried by the lower electrode 10. During the period of forward travel of the carrying member 10, the disc 34 of the switching device 32 has reached a position where the brushes 40 are riding over the non-conducting portion 38 of the disc 34 so that no charge is supplied to the upper electrode 26, and whatever charge has been deposited thereon in the previous half cycle is discharged to ground at 46 through the resistor 42.

Since during the rearward travel of the carrying member 10, the electrostatic force is exerted on the material, the frictional force exerted by the surface 12 sliding rearwardly beneath the material thereon is diminished as compared to the frictional force exerted during the forward portion of travel of the carrying member 10 when the electrostatic field between the electrodes 26 and 10 is dissipated. Thus, on each cycle of reciprocation of the carrying member 10, there is imparted to the material thereon a net increment of forward travel, which causes the material to move from the infeed chute 16 forwardly to the collector 18.

In practice, to obtain the maximum rate of conveying, it has been found necessary to so arrange the switching device 32 with respect to the drive eccentric 20 as to cause the conducting half-cycle of the disc 34 to precede the beginning of the rearward travel of the carrying member 10. One reason for this is believed to relate the phase relationship of the time periods during which the particles slide with respect to the carrying member 10 or are stationary with respect to the member 10. By adjusting the phase relationship between the eccentric 20 and the switching device 32 (as by changing the adjustable connection 50 of the eccentric 20), the portions of the cycle of reciprocation of the carrying member 10 during which the electrostatic field is established between the electrodes 26 and 10 can be modified, so as to change the rate (and if desired, the direction) of travel of the material along the upper surface 12 of the carrying member 10. Rate of conveying could also be changed by modifying the strength and/or duration of the electrostatic field.

The apparatus of the second embodiment of the present invention, illustrated in FIGURES 2 through 4, is arranged to accomplish a "selective" conveying of particulate material, so as to cause a classification or separation of the same. The operation of this second embodiment will be described in terms of a practical application in flour milling, by which the bran portion of flour milling stock is separated from the endosperm. In describing the structure of this second embodiment, components of this second embodiment which are similar to corresponding components of the first embodiment will be given like numerical designations, with a prime (') designation distinguishing those of the second embodiment.

In this second embodiment there is a carrying member 10' which is reciprocated transversely to its longitudinal axis by an eccentric 20' driven by a motor 22'. As in the previous embodiment, there is a power pack 30', one terminal 28' of which is connected through a switching device 32' to the upper electrode 26', and the other terminal 44' of which is grounded at 46' and is connected through a resistor 42' to the upper electrode 26'. As in the previous embodiment, the switching device 32' is driven from the same shaft 21' as drives the eccentric 20' so that a voltage is established between the upper and lower electrodes 26' and 10' periodically in phased relationship with the reciprocating motion of the lower carrying electrode 10'. The switching device 32' is so arranged that when the carrying member 10' during a cycle of reciprocation is travelling rearwardly, it conducts to the upper electrode 26' so that an electrostatic field is established between the electrodes 26' and 10' to exert a lifting force on the flour stock being fed onto the carrying surface 12', and at the beginning of the forward travel of the member 10', the electrostatic field is dissipated through the resistance 42'.

It will be noted that in this second embodiment the infeed chute 16' is positioned at the rear of the carrying member 10' and at one side thereof (as seen in FIGURE 2, at the left side of the carrying member 10'). Also, the carrying surface 12' of the lower electrode carrying member 10' has a moderate downward slope both to the rear (as seen in FIGURE 3) and to the right (as seen in FIGURE 4). The collector of the present embodiment is not positioned at the front end of the carrying member 10', as it was in the first embodiment, but is positioned at the right side thereof, and is comprised of a forwardly and a rearwardly positioned collector 18a' and 18b', respectively. To prevent the flour stock which is to be classified from moving off either the front or rear edge of the carrying surface 12', there is a front and a rear retaining wall 52 and 54, respectively, on the carrying member 10'.

In the operation of the apparatus of this second embodiment, flour stock from the chute 16' feeds onto the carrying surface 12' at the rear left portion thereof. The oscillating motion of the carrying member 10' will immediately cause this flour stock to spread out over the carrying surface 12' to some degree and will agitate this flour stock to the extent that the bran portion thereof will tend to separate from the endosperm to some degree, to form a bran dominated upper layer and a lower layer predominately of endosperm. Partly because of this bran tending to separate as an upper layer and partly for other reasons relating to the manner in which these particles of flour stock accept an electrical charge, the bran fraction in comparison with the endosperm fraction is more susceptible to the electrostatic force exerted by the field between the electrodes 26' and 10'. That is to say, in relation to the weight thereof, the bran fraction is attracted more strongly toward the upper electrode 26' than is the endosperm. Thus, for the reasons indicated in describing the conveying action accomplished by the apparatus of the first embodiment, the phased electrostatic forces established between the electrodes 26' and 10' tend to convey the bran fraction forwardly along the carrying surface 12' to a greater extent than the endosperm fraction.

Because of the downward slope of the carrying surface 12' both to the rear and to the right, the flour stock, which is sliding back and forth due to the oscillating motion of the carrying member 10', has a tendency to move both rearwardly and to the right. The electrostatic force between the electrodes 26' and 10', being phased with the reciprocating motion of the carrying member 10', has the conveying action contributed thereby directed along a longitudinal component and does not detract from the tendency of the flour stock to migrate to the right; but it does act directly oppositely to the tendency of the flour stock to travel along a rearwardly directed travel component contributed by the rearward slope of the carrying surface 12'. By properly selecting the rearward slope of the carrying surface 12' in relation to the conveying effect of the electrostatic force contributed by the electrodes 26' and 10', the electrostatic conveying force will predominate with respect to the bran fraction of the flour stock, while the rearward conveying component contributed by the rearward slope of the carrying surface 12' will predominate with respect to the endosperm fraction of the flour stock. Thus of the flour stock entering at the left rear portion of the carrying surface 12', the bran fraction will migrate forwardly and to the right (along the resultant path of its net forward travel component and its travel component to the right perpendicular thereto) to be collected in the forward collector 18a'. However, the endosperm portion of the flour stock will follow a path to the right along the back wall 54 of the carrying member 10' and fall into the rear collector 18b'.

The third embodiment of the present invention is illustrated in FIGURES 5 and 6. Since the component parts of this third embodiment are quite similar to corresponding component parts of the second embodiment, a description of those of the third embodiment in any detail would merely be redundant. It is believed that with a cursory description of this third embodiment, the nature and operation of the component parts of this third embodiment will be apparent in light of the previous description, if the numerical designations given to the component parts of the third embodiment are made to correspond to similar component parts of the second embodiment, with a double (") prime designation distinguishing those of the third embodiment.

Thus it can be seen in this third embodiment that there are upper and lower electrodes 26" and 10", that the lower carrying electrode 10" is driven from the motor 22" through the eccentric 20", and that a power pack 30" through a switching device 32" periodically establishes a voltage between the upper and lower electrode 26" and 10". However, the lower carrying electrode 10" is mounted differently from the carrying electrodes 10 and 10' of the previous two embodiments, in that the carrying electrode 10" of the present embodiment is carried by moderately slanted swing mounted hangers 56 so that the reciprocating motion imparted to the carrying electrode 10" has a substantial horizontal component and also a moderate vertical component. As shown herein, the lower electrode 10" travels an oscillating path forwardly and upwardly on one half-cycle and downwardly and rearwardly on the second half-cycle. The effect of this is (as is well known in the art of flour milling) to impart a travel component to the stock carried thereon in the horizontal direction which the carrying member 10" travels as it is also moving upwardly (which, as shown herein, is forward).

A second difference of this apparatus of the third embodiment is that the switching device 32" is so arranged that the electrostatic field created between the electrodes 26" and 10" is established when the carrying member 10" is moving forwardly in each cycle of reciprocation. Thus, for reasons explained hereinbefore in the description of the operation of the first embodiment, an upward force is exerted on the flour stock during the forward motion of the carrying member 10" to lessen the frictional force between the carrying surface 12" and the flour stock thereon. The effect of this phased electrostatic force is to tend to move the flour particles rearwardly along the carrying surface 12". As in the second embodiment, the oscillating motion of the carrying member 10" tends to separate the bran out as an upper layer and the endosperm as a lower layer, and the electrostatic effect is greater with respect to the bran particles than it is with the endosperm particles. On the other hand, the endosperm particles being in contact to a greater degree with the carrying surface 10" are effected to a greater extent in comparison with the bran particles, by the effect of the vertical component of reciprocation being added to the horizontal component.

As in the previous embodiment, the carrying surface 12" is sloped rearwardly and to the right (i.e. toward the collectors 18a" and 18b"), to impart to the flour stock travel components both to the rear and to the right. By properly establishing the conveying effect contributed by the electrostatic field between the electrodes 26" and 10", the slope in a longitudinal direction of the carrying surface 12", and the amplitude, frequency and angle of the reciprocating motion of the carrying member 10", the electrostatic effect and the slope effect can be made to predominate for the bran fraction of the flour stock, while the conveying effect contributed by the slanted path of oscillation of the carrying member 10" can be made to predominate for the endosperm fraction. However, since the travel component to the right contributed by the downward slope of the carrying surface 12" to the right is perpendicular to the direction of these other conveying forces, both bran and endosperm will tend to migrate to the right. The resultant path of the endosperm will be forward and to the right, so that the endosperm is collected in the forward collector 18a", while the resultant path of the bran will be to the right along the rear wall 54" of the carrying member 10" so that the bran is collected in the rear collector 18b". It should be noted that depending on the magnitude of the conveying effects contributed by the electrostatic force and the angled oscillation of the carrying member 10", the rearward slope of the carrying surface 12" could be eliminated, so that the carrying surface 12" can be horizontal, or perhaps even slope forwardly.

It should be understood that the foregoing is merely illustrative of a certain embodiment of the invention and many variations may be made by those skilled in the art withoupt departing from the spirit and scope of the invention.

Now therefore I claim:

1. An apparatus for conveying particulate material, said apparatus comprising:
   (a) a lower electrode having an upwardly disposed carrying surface for said material, said electrode having a feed end and a discharge end,
   (b) means for admitting material onto said electrode at the feed end,
   (c) said discharge end permitting said material to be discharged from said electrode,
   (d) reciprocating means to move said lower electrode cyclicly along a predetermined path having a substantial horizontal path component with sufficient acceleration to at least cause sliding of said material with respect to said carrying surface,
   (e) an upper electrode,
   (f) means for positioning said upper electrode generally above said lower electrode,
   (g) means for energizing said upper electrode thereby establishing an electrostatic field between said electrodes, the lines of force of said field having a substantial component perpendicular to said carrying surface of said lower electrode, and
   (h) means operatively connected to the energizing means for cyclicly establishing a voltage of a predetermined intensity between said electrodes only during a selected portion of each cycle of movement of said lower electrode, said voltage being established in timed relationship with the reciprocating means and causing an electrostatic force of a predetermined intensity to be exerted on said material.

2. The apparatus as recited in claim 1, wherein said lower electrode has components of movement generally back and forth along a path substantially perpendicular to an axis extending from the feed end to the discharge end and said electrostatic force is imparted to said material during a portion of travel of said lower electrode along said path to impart a first component of travel of said material along a direction of travel generally paralleling said path, said lower electrode being sloped along a predetermined direction of slope other than the direction of said first component of travel so as to impart a second component of travel to said material whereby a first portion of said material which is more susceptible to electrostatic force is conveyed along a resultant path different from a second portion of said material having less susceptibility to electrostatic force, so that said first portion of material is separated from said second portion.

3. The apparatus as recited in claim 2, wherein said direction of slope has a substantial component generally transverse to the direction of said first component of travel.

4. The apparatus as recited in claim 2, wherein said direction of slope has a substantial component generally opposite in said direction to the direction of said first component of travel.

5. The apparatus as recited in claim 4, wherein said direction of slope also has a substantial component of slope generally transverse to the direction of said first component of travel imparted by said electrostatic force.

6. The apparatus as recited in claim 1, wherein said lower electrode travels a cyclic path which is substantially perpendicular to an axis extending from the feed end to the discharge end, the first half-cycle of which is generally upward and forward, and the second half-cycle of which is generally downward and rearward, so as to impart to said material a first component of motion in a forward direction, and said electrostatic force is established during said first half-cycle so as to impart to said material a second component of travel opposite to said first component of travel, whereby a first portion of the material which is more susceptible to electrostatic force is conveyed along a resultant path different from a second portion of said material having less susceptibility to electrostatic force, so that said first portion of said material is separated from said second portion.

7. The apparatus as recited in claim 6, wherein said lower electrode is sloped along a predetermined direction of slope so as to impart to said material a third component of travel generally in the direction of said slope.

8. A process for conveying particulate material along an upwardly disposed surface of a lower electrode, said electrode having a feed end and a discharge end, said process comprising:
(a) admitting said material onto said surface proximate said feed end,
(b) reciprocally moving said lower electrode along a predetermined path having a substantial horizontal path component with sufficient acceleration to at least cause sliding of said material with respect to said conveying surface, and
(c) imparting a voltage at predetermined intervals to an upper electrode which is located above said lower electrode so that an electrostatic field is periodically established between said electrodes, said field being of a predetermined intensity with lines of force of said field having a substantial component perpendicular to the carrying surface of said lower electrode, said voltage being imparted to the upper electrode and said electrostatic field being established only during a selected portion of each cycle of movement of the lower electrode.

9. The process as recited in claim 8, wherein said material is made up of a first portion having greater susceptibility to electrostatic force and a second portion having less susceptibility to electrostatic force, wherein said first portion of said material has imparted thereto a component of travel differing from said second portion of said material, whereby a separation of said material is accomplished.

10. The process as recited in claim 9, wherein said lower electrode has components of movement generally back and forth along a path substantially perpendicular to an axis extending from the feed end to the discharge end and said electrostatic force is imparted to said material during a portion of travel of said lower electrode along said path to impart a first component of travel of said material along a direction generally paralleling said path, and said lower electrode is sloped along a predetermined direction of slope other than the direction of said first component of travel to impart a second component of travel to said material, whereby a first portion of said material which is more susceptible to electrostatic force is conveyed along a resultant path different from a second portion of said material having less susceptibility to electrostatic force, so that said first portion of material is separated from said second portion.

11. The process as recited in claim 10, wherein said direction of slope has a substantial direction component generally transverse to the direction of said first component of travel.

12. The process as recited in claim 10, wherein said direction of slope has a substantial component generally opposite in direction to the direction of said first component of travel .

13. The process as recited in claim 9, wherein said lower electrode is oscillated along a path which is substantially perpendicular to an axis extending from the feed end to the discharge end, said path having a substantial horizontal component and also a vertical component so that said lower electrode travels in a cycle on an upwardly sloped path and then on a downwardly sloped path, and said electrostatic force is exerted on said material mostly during that portion of the cycle during which the lower electrode is travelling upwardly, so that said electrostatic force in conjunction with the motion of said lower electrode tends to move said particles generally along the direction which said lower electrode moves in its downward course, whereby said first portion of said material is moved along a path having a component of travel generally in the direction of movement of said lower electrode as it moves on its downwardly sloped path, and said second portion of material is moved along a path having a component generally in the direction of motion of said lower electrode as it moves on the upwardly sloped portion of its path.

14. The process as recited in claim 13, wherein said lower electrode is sloped along a direction having a substantial component generally transverse to said oscillating path, whereby said material migrates down said slope as said portions of said material separate from each other.

References Cited by the Examiner
UNITED STATES PATENTS
1,375,741  4/1921  Sutton _____ 209—127.3

FRANK W. LUTTER, *Primary Examiner.*